United States Patent [19]

Martin et al.

[11] 4,207,155
[45] Jun. 10, 1980

[54] DILUENTS FOR ULTRAVIOLET COATING COMPOSITIONS

[75] Inventors: Preston K. Martin, East Brunswick; William A. Hoffman, III, North Bergen; John C. Trebellas, Berkeley Heights, all of N.J.

[73] Assignee: Celanese Corporation, New York, N.Y.

[21] Appl. No.: 917,246

[22] Filed: Jun. 20, 1978

Related U.S. Application Data

[63] Continuation of Ser. No. 650,332, Jan. 19, 1976, abandoned.

[51] Int. Cl.$^2$ ............ C08F 2/50; C08F 24/00
[52] U.S. Cl. ............ 204/159.23; 428/521; 428/522; 526/266
[58] Field of Search ............ 526/266; 204/159.23

[56] References Cited

U.S. PATENT DOCUMENTS

| | | | |
|---|---|---|---|
| 2,921,006 | 1/1960 | Schmitz et al. | 204/159.22 |
| 3,224,951 | 12/1965 | D'Alelio | 526/266 |
| 3,267,084 | 8/1966 | Rankin et al. | 526/266 |
| 3,271,377 | 9/1966 | Mantell et al. | 526/266 |
| 3,715,293 | 2/1973 | Sandner et al. | 204/159.23 X |
| 3,759,807 | 9/1973 | Osborn et al. | 204/159.23 |

OTHER PUBLICATIONS

D'Alelio et al., *Journal of Polymer Science*, Part A-1, vol. 5 (1967), pp. 287-306.

*Primary Examiner*—Walter C. Danison
*Attorney, Agent, or Firm*—Kenneth A. Genoni

[57] ABSTRACT

A new composition of matter particularly useful as a diluent in ultraviolet coating compositions is disclosed, having the formulae:

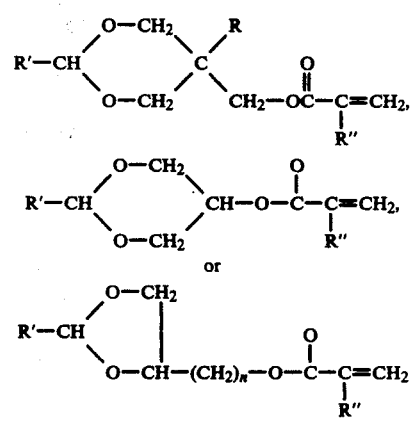

wherein R is —CH$_3$ or —CH$_2$CH$_3$, R' is hydrogen, C$_1$–C$_3$ alkyl or C$_1$–C$_3$ halogenated alkyl, R" is hydrogen or methyl, and n is 1–4.

7 Claims, No Drawings

DILUENTS FOR ULTRAVIOLET COATING COMPOSITIONS

This is a continuation, filed Jan. 19, 1976, now abandoned.

BACKGROUND OF INVENTION

This invention relates to new compositions of matter. More particularly, this invention relates to new compositions of matter which are useful as diluents for ultraviolet curable coating compositions.

Monomeric diluents for coating compositions, particularly those useful in ultraviolet curing applications are well known. The diluents for the most part are monofunctional unsaturated materials which act to reduce the viscosity of the total system, so that coating can be more efficiently accomplished. However, because of their relatively low molecular weight, many diluents are of high volatility. This volatility factor causes diluent evaporation which in turn alters the viscosity of the coating itself.

This high volatility also results in coating compositions which have undesirable odor characteristics. Finally, many lower volatility diluents are not of sufficient reactivity to allow their use in ultraviolet curable systems where small amounts of energy are employed in the curing process.

U.S. Pat. No. 3,530,167 discloses certain acetal-type polymers. However, the particular acetals utilized in the instant invention are not disclosed.

The *Journal of Radiation Curing*, July, 1975, discloses certain novel photosensitive monomers and polymers which are of the heterocyclic type, as does U.S. Pat. No. 3,759,942, to Himics.

The *Journal of Polymer Chemistry*, Part A-1, Vol. 5, pp. 287–306, 1967, discloses certain dioxolane-containing materials which are based upon a reaction between a polyol and a ketone. U.S. Pat. No. 3,271,377, to Mantell, et al, discloses certain compounds where the ester group is attached to a different carbon atom than are the ester groups disclosed in the instant invention.

It is also an object of this invention to prepare diluents, particularly diluents for ultraviolet curable systems.

It is another object of this invention to prepare ultraviolet coating diluents having improved cure rates, color, viscosity control, and lower volatility.

These and other objectives are obtained by preparing the compositions of the instant invention.

SUMMARY OF INVENTION

Basically, the instant invention involves the discovery that the following new compositions of matter are particularly useful as ultraviolet curable coating composition diluents:

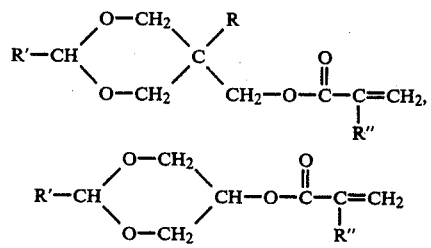

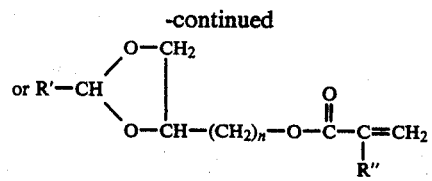

In the above formulae, R is $-CH_3$ or $-CH_2CH_3$, R' is hydrogen or $C_1-C_3$ alkyl or $C_1-C_3$ halogenated alkyl, R" is hydrogen or methyl, and n is 1–4.

DESCRIPTION OF INVENTION

Basically, the compositions of the instant invention are prepared according to the following reaction scheme:

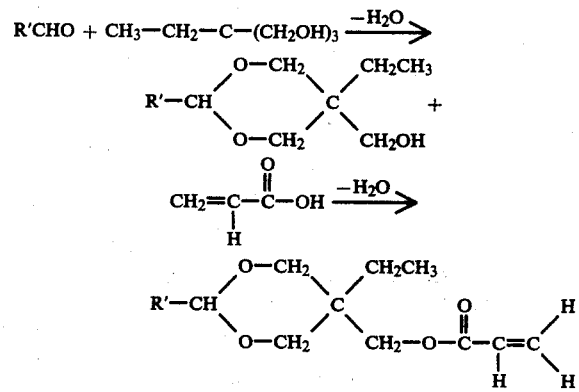

In the first step of the reaction, an aldehyde, selected from formaldehyde (employed as formalin) and the $C_2-C_4$ aldehydes, as well as the $C_2-C_4$ halogenated aldehydes, such as chloral, is reacted at temperatures up to about 150° C., preferably below about 100° C., in essentially equimolar ratios with a triol, selected from trimethylolpropane, trimethylolethane, glycerin, and triols having the formula

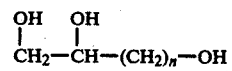

wherein n is 1–4.

The reaction itself may be catalyzed by the use of an acid catalyst, such as hydrochloric acid, methane sulfonic acid, paratoluene sulfonic acid, and the like. The reaction is carried out preferably in the presence of a low boiling point reflux solvent such as benzene. The water of reaction is removed as it is formed and when the theoretical amount of water has been removed, the reaction is deemed complete.

Preferably the product should then be washed and purified by conventional purification methods, including extraction, distillation, evaporation and the like. The resulting product is liquid and may be utilized as is for further reaction to form the acrylate or methacrylate ester.

Acrylation of methacrylation may be carried out by one of three different steps. Transesterification may be utilized whereby at least about 1 mole of a low boiling alcohol acrylate or methacrylate, for example, ethylacrylate, is transesterified with 1 mole of the cyclic alcohol utilizing a transesterification catalyst such as titanium esters, titanium chelates, aluminum, bismuth, zinc, barium, copper, tin, chromium, calcium, antimony, cadmium or tin alcoholates, carboxylates, halides or alkyl oxides or primary, secondary, or tertiary amines or quaternary ammonium salts. The catalyst is utilized at about the 0.5 to 5 percent, by weight, level, based upon the reactants.

During the transesterification reaction, the lowest possible temperature to effect transesterification is employed. As the transesterification proceeds, the transesterification product, i.e., in the case of ethylacrylate, ethanol, is removed preferably by the application of a vacuum. Reaction proceeds at temperatures generally in the range of about 70° to 100° C. until the full amount of the transesterification product is removed.

An alternate method of acrylating or methacrylating the cyclic alcohol is by utilizing a Schotten-Baumann type procedure, in which acryloyl chloride or methacryloyl chloride is reacted with the alcohol in the presence of a molar equivalent of a tertiary amine, such as triethylamine or pyridine. In this procedure the components are mixed in generally equal molar ratios with the reaction temperature maintained in the range of about 25° to 75° C. Following preparation of the material, the acrylate or methacrylate is purified as above.

A final method of preparing the acrylate or methacrylate material is via a direct esterification reaction utilizing essentially equal molar ratios of the reactants, although an excess of acrylic or methacrylic acid may be utilized, at temperatures up to about 200° C., preferably up to about 150° C.

Employed in the esterification may be an esterification catalyst. Examples include paratoluene sulfonic acid, methane sulfonic acid, and generally any of the sulfonic or carboxylic acids, or preferably an ion exchange esterification catalyst, such as those divinyl benzene-styrene sulfonic acid reaction products.

In carrying out the esterification, transesterification or acid chloride acrylations or methacrylations according to the instant invention, a polymerization inhibitor may be utilized. Examples of such materials include the quinones, such as hydroquinone and its monomethyl ether, the various phenols, p-tert-butylcatechol, p-methoxyphenol, 2,4-dichloro-6-nitrophenol, n-propyl gallate, di-tertbutyl-p-cresol, 2,2'-methylenebis(4-methyl-6-tertbutylphenol), 1-amino-7-naphthol, p-benzoquinone, 2,6-dichloro-p-benzoquinone, 2-amino-1,4-naphthoquinone, 3-aminoanthraquinone, diphenylamine, p-nitrosodimethylaniline, α and β-naphthylamine, nitrobenzene, phenothiazine, N-nitrosodimethylamine, hexamethylphosphoramide, n-dodecyl mercaptan, benzenethiol, 2,2-diphenyl-1-picrylhydrazyl (phenyl hydrazine), divinylacetylene, and various antimony and copper salts. Most preferred among the inhibitors are paramethoxyphenol, hydroquinone and its monomethyl ether, phenothiazine, and nitrobenzene. The inhibitors should be added to the reaction mixture in the range of about 50–1000 parts per million parts by weight of reactant, preferably about 100–400 ppm.

Following esterification, transesterification, etc., the products of this invention may be purified by common purification methods, including solvent extraction, washing, drying, evaporation, and distillation.

The compositions of the instant invention, as previously set out, are used as diluents in ultraviolet curable systems, where rapid cure rates, low viscosities, low volatility, and good color are required.

The compounds of this invention may comprise from about 2.5 to about 100 percent, by weight, preferably 2.5 to about 60 percent, by weight, of the ultraviolet curable system. The system can also contain about 97.5 to about zero percent, preferably about 97.5 to about 40 percent, by weight, based on the total curable composition, of an alpha beta ethylenically unsaturated vinyl polymerizable compound containing at least two vinyl polymerizable groups per molecule.

Included among the poly alpha beta ethylenically unsaturated compounds are unsaturated esters of the alpha methylene carboxylic acids, e.g., ethylene diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetraacrylate and methacrylate, trimethylolpropane triacrylate, trimethylolethane triacrylate, dipentaerythritol hexacrylate, tripentaerythritol octaacrylate, sorbitol hexacrylate, 1,3-propanediol diacrylate, 1,5-pentanediol dimethacrylate, hexanediol diacrylate, the bis-acrylates and methacrylates of polyethylene glycols of a molecular weight of 200–1500, and the like; unsaturated amides, particularly those of the alpha methylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gammamethacrylamidopropoxy)ethane, betamethacrylamidoethylmethacrylate, N-beta-hydroxyethyl-beta-(methacrylamido)ethyl acrylate, and N,N-bis(beta-methacryloxyethyl)acrylamide; vinyl esters such as divinyl succinate, divinyl adipate, divinyl phthalate, divinyl terephthalate, divinyl benene-1,3-disulfonate, and divinyl butane-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyl and amino groups is solely carbon or oxygeninterrupted carbon.

The polyethylenic unsaturation can be present as a substituent attached to a preformed polymer resin, such as an alkyd, a polyester, a polyamide, a polyurethane or a vinyl homo- or copolymer. Also included are polymers containing maleic and fumaric acids or esters, as well as polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc.

In addition to the aforementioned polyfunctional polymerizable compounds, compounds containing a single polymerizable ethylenically unsaturated group of the structure

can also be utilized. In addition to traditional "monomers", as described hereafter, the monounsaturated compounds may be polymeric materials, as previously described, containing on the average a single site of unsaturation on each polymer molecule. These "monomers" can be aliphatic, aromatic, cycloaliphatic or any variant thereof. Among the monomers are included styrene, 4-methylstyrene, alphamethylstyrene, and the like; acrylic acid and its nitrile, amide and $C_1$–$C_{12}$ alkyl, aryl, or hydroxy alkyl derivatives, such as acrylonitrile, ethylacrylate, 2-ethylhexyl acrylate, butoxyethoxyethyl acrylate, hydroxyethyl acrylate, as well as others; the vinyl halides, such as vinyl chloride, vinylidene chloride, and the like; vinyl ketones such as vinyl phenyl ketone, vinyl methyl ketone, alphachlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

These monounsaturated materials may be added in amounts ranging up to about 57.5 percent, by weight, based upon the total ultraviolet system.

The blends of the instant invention can also contain up to about 60 percent, by weight, based upon the total curable system, of a polymeric material containing no polymerizable unsaturation. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

If desired, the photo-polymerizable compositions of the instant invention can also contain immiscible polymeric or non-polymeric organic or inorganic fillers or reinforcing agents, e.g., the organophilic silicas, bentonites, silica, powdered glass, colloidal carbon, as well as various other types of dyes and pigments, in varying amounts.

The ultraviolet curable compositions of the instant invention contain photoinitiators such as benzoin derivatives, as disclosed in German Patent No. F523401VC/396, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-choroxanthone, 3,9-dichloroxanthone, thioxanthone, and chlorinated thioxanthones, 3-chloro-8-nonylxanthone, 3-methoxyxanthone, 3-iodo-7-methoxyxanthone, and the like.

Also included are the acetophenone photosensitizers of the type described in U.S. Pat. No. 3,715,293, having the structure

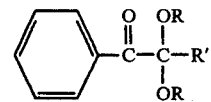

wherein R is alkyl of from 1–8 carbon atoms, or aryl with 6 carbon atoms, and R' is hydrogen, alkyl of from 1–8 carbon atoms, aryl of from 6–14 carbon atoms or cycloalkyl of 5–8 carbon atoms.

The alkylphenone photosensitizers having the formula

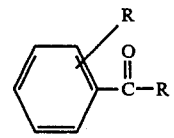

the benzophenone type photosensitizers having the formula

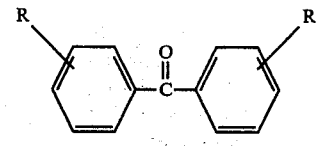

the tricyclic fused ring type having the formula

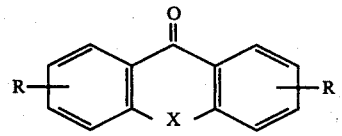

and the pyridyl type having the formula

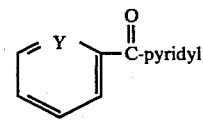

wherein the various substituents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1-4-napthoquinone, 9-10-phenanthrenequinone, 1,2-benzanthraquinone, 2-3-benzanthraquinone, 2-methyl-1,4-naphthoquinone, 2-3-dichloronaphthoquinone, 1-4-dimethylanthraquinone, 2-3-dimethylanthraquinone, 2-phenylanthraquinone, 2-3-diphenylanthraquinone, sodium salts of anthraquinone alphasulfonic acid, 3-chloro-2-methylanthraquinone and the like. Other photoinitiators which are also useful are described in U.S. Pat. No. 2,760,863 and include vicinal ketaldonyl compounds, such as diacetyl benzyl, etc., alpha ketaldonyl alcohols, such as benzoin, pivaloin, etc., acyloin ethers, e.g., benzoin methyl and ethyl ethers, etc., alpha hydrocarbon substituted aromatic acyloins, including alphamethyl benzoin, alpha-allyl benzoin, and alpha-phenyl benzoin. Also included are the diacylhalomethanes, corresponding to one of the general formulas:

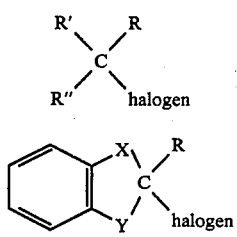

and wherein halogen represents a halogen atom such as chlorine or bromine; R represents a hydrogen atom, a chlorine or bromine atom, or an acetyloxy group; R' and R" (same or different) represent a benzoyl group, a nitrobenzoyl group, a dimethylamino benzoyl group, a phenyl sulfonyl group, a carboxy phenyl sulfonyl group, a methylphenyl sulfonyl group, or a naphthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl acetal phenone) and the like, as further described in U.S. Pat. No. 3,615,455.

Other photoinitiators are cataloged by G. Delzenne in *Industrie Cimique Belge*, 24 (1959), 739–764. Most preferred among the added initiators are benzoin and its alkyl ethers, benzophenone and its derivatives, as in Formula III, xanthone, thioxanthones, and chlorinated thioxanthones, acetophenone derivatives, as set out in formula I, and halogenated, aliphatic and aromatic polychlorinated biphenyls and polyphenyls.

The photosensitizers can be added in an amount of up to about 15 percent, by weight, based upon the total curable system, preferably up to about 5 percent.

Although not required, certain organic amines can be added to the photosensitizers above-described to further enhance the cure rate of the compositions of the instant invention in amounts up to about 500 percent, by weight, of the photosensitizer, preferably up to about 50 percent, by weight. The amines can be primary, secondary, or tertiary.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, dodecylamine, tridodecylamine, tri-2-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl-amine, tribenzylamine, triphenethylamine, benzyl-d-methylamine, benzyldihexylamine, trischlorophenethylenimine, N-methylethylenimine, N-cyclohexylethylenimine, piperidine, N-ethylpiperidine, 2-methylpiperidine, 1,2,3,4-tetrahydropyridine, 1,2-dihydroxypyridine, 2-, 3- and 4-picoline, morpholine, N-methyl morpholine, N-2-hydroxyethyl morpholine, N-2-ethoxyethylmorpholine, piperazine, N-methylpiperazine, N,N"-dimethylpiperazine, 2,2-dimethyl-1,3-bis[3-(N-morpholinyl)-propionyloxy]propane, 1,5-bis[3-(N-morpholinyl)-propionyloxy]diethyl ether, and the like. The preferred organic amines are the tertiary amines, with the alkanol amines being most preferred. The specific preferred amine activators are tri-ethanolamine, morpholine and methyldiethanolamine.

The compositions of the instant invention, after being prepared in the ratios as set out above, can be applied to the material to be coated by conventional means, including brushing spraying, dipping, curtain and roll coating techniques, and may, if desired, be dried under ambient or oven conditions to provide coating films on the substrate. The substrate can be of any composition, e.g., wood, metal, paper, plastic, fabric, fiber, ceramic, concrete, plaster, glass, etc.

Typically a mixture of the compositions described above, and where utilized, the amine activator, is prepared and the composition applied to the desired substrate. It is then exposed to electromagnetic radiation having wave lengths of above about 2000 Angstrom units, preferably from about 2000 up to about 5000 Angstroms. Exposure should be from a source located about 1 to 5 inches from the coating for a time sufficient to cause crosslinking of the composition and can range from about 0.1 seconds up to about 1 min./linear ft. Generally, the light radiation will have a power of about 1–600 watts per linear inch.

The light radiation can be ultraviolet light generated from low, medium and high pressure mercury lamps. This equipment is readily available and its use is well known to those skilled in the art of radiation chemistry. Other sources include electron beam radiation, plasma arc, laser beams, etc.

In the following examples, all parts and percentages are by weight, unless otherwise indicated.

EXAMPLE 1

Into a reactor equipped with a mechanical agitator, reflux condenser with Dean Stark Trap, sampling device and thermometer, were added 400 g. of trimethylolpropane, 243.2 g. of 37 percent, by weight, aqueous formaldehyde, 18 g. of paratoluene sulfonic acid and 3 liters of benzene. The contents were refluxed at about 100° C. until about 209 g. of water were removed. The reaction mixture was then cooled and extracted with three 100 ml. parts of 30 percent aqueous formate to remove the catalyst. The resulting organic layer was dried over magnesium sulfate and the solvent stripped on a rotofilm evaporator to remove the benzene. The crude material was distilled under vacuum and there resulted 381 g. (87% by weight yield) of the cyclic formal (bp 110°–120° C., 3 mm/Hg.).

73 g. of the resulting product were mixed with 40 g. of acrylic acid, 150 ml. of benzene, 10 g. of Amberlyst 15 ion exchange catalyst, available from the Rohm and Haas Corporation, having an hydrogen equivalent weight of 204.1 g./eq., and prepared based upon styrene sulfonic acid and divinyl benzene, 0.0109 g. pf phenothiazine and 0.0109 g. of nitrobenzene. The above-identified constituents were mixed in a three-necked reactor having a mechanical agitator, nitrogen sparge, condenser and Dean Stark trap, and the contents were heated to 90° C. Approximately 7 g. of water were removed over 6-8 hours. The solution was then cooled and filtered, and the excess acrylic acid and benzene were stripped under vacuum. The resulting mixture was then stirred for 15 minutes with 2 g. of activated charcoal and filtered, resulting in a product which was 90 percent reacted.

EXAMPLE 2

The diluent properties of various monofunctional monomers were evaluated in a formula comprising 45 parts of the di-acrylate ester of the diglycidyl ether of bisphenol A, 15 parts of trimethylolpropane triacrylate, 20 parts of 1,6-hexanediol diacrylate, 15 parts of diluent, 3 parts of benzophenone, and 2 parts of dimethylaminoethanol.

The resulting formulation was then drawn down with a 1 mil Bird wet film applicator on Bonderite (Parker Division) 1000 metal test panels and cured by exposure to a 200 watt/linear inch ultraviolet lamp, with the results set forth in the table below:

| Monomer | Tukon Hardness (KHN units) Exposure to UV lamp | |
|---|---|---|
| | 1 second | 2 seconds |
| 1,4-Butanediol Mono-acrylate | 7.4 | 9.4 |
| 2-Ethylhexyl Acrylate | 4.1 | 10.1 |
| Cyclohexyl Acrylate | 8.5 | 12.8 |
| Dibutyl maleate | 3.5 | 8.1 |
| Dibutyl Fumarate | 4.0 | 9.1 |
| Trimethylolpropane Cyclic Formal Acrylate (Example 1) | 9.3 | 16.0 |

As can be seen from the above table, the trimethylolpropane cyclic formal acrylate exhibits improved cure response properties at both low and high cure rates.

EXAMPLE 3

95 parts of the trimethylolpropane cyclic formal acrylate prepared in Example 1 were blended with 3 parts of benzophenone and 2 parts of dimethylaminoethanol. The 0.2 mil coating was drawn down with a Bird applicator and exposed to a 200 watt/linear inch ultraviolet lamp for 6 seconds, on both glass and Bonderite 1000 metal panels.

An NMR spectra of the film applied to glass confirmed complete polymerization and removal of the acrylate unsaturation.

On the Bonderite panels the Tukon hardness was 7.0, pencil hardness F-H, reverse impact 68-72. The film passed a conical Mandrel bend, and was removed by 1 MEK rub.

EXAMPLE 4

The cured state and diluent properties of various potential diluents was evaluated in the attached table. The cured state properties were evaluated in a formulation which contained 95 parts of the particular monomer, 3 parts of benzophenone and 2 parts of dimethylaminoethanol. All cured state evaluations were carried out by exposing a 0.2 mil thick film of the test material to a 200 watt/linear inch ultraviolet lamp under the conditions described in the attached table.

Table 2

EVALUATION OF ACRYLATES

| Acrylate | Cure Speed Tack-Free (Pass at fpm) | Odor | Gardner Color | Brookfield Viscosity Sp. #1 (at 60 rpm) | Volatility (20 hrs. Hood) | Boiling Point, °C. Corrected to 760 mm Hg |
|---|---|---|---|---|---|---|
| Difunctional | | | | | | |
| Hexanediol diacrylate | 1 at 25 | Definite | <1 | 8.5 cps | −0.37 | 320 |
| Neopentylglycol diacrylate | 1 at 20 | Definite | <1 | 7.5 cps | −0.57 | |
| 1,4-butanediol diacrylate | 2 at 20 | Definite | 3 | 6.0 cps | −2.41 | 250 |
| Diethyleneglycol diacrylate | 1 at 35 | Very Slight | <1 | 8.5 cps | +0.68 | |
| Triethylene glycol diacrylate | 1 at 45 | Slight | <1 | 12.5 cps | +1.32 | |
| Monofunctional | | | | | | |
| 2-ethylhexyl acrylate | Wet | Strong | <1 | 2.0 cps | −34.88 | 215 |
| Trimethylolpropane cyclic formal acrylate (Ex. 1) | 6 at 20 | Definite | <1 | 11.0 cps | −2.26 | 240 |
| Cyclohexyl acrylate | 10 at 20 | Strong | <1 | 5.5 cps | −94.17 | 184 |
| Dimethyl maleate | Wet | Very slight | <1 | 4.0 cps | −33.86 | 210 |
| Dibutyl maleate | Wet | Very slight | <1 | 6.5 cps | −0.91 | 275 |
| Dibutyl fumarate | Wet | Very slight | <1 | 6.5 cps | −0.72 | |
| 1,4-butanediol monoacrylate | Slightly tacky, Dull, 10 at 20 | Definite | 1 Red Tinge | 10.5 cps | +2.73 | 245 |
| Tetrahydrofurfural acrylate | Slightly Tacky, Crinkle, 10 at 20 | Strong | <1 | 4.5 cps | −20.79 | 230 |
| Benzyl Acrylate | 10 at 20 | Strong | 3 | 4.5 cps | −14.88 | 170 |
| Benzyl acrylate | 10 at 20 | Definite | 4 | 4.5 cps | −17.67 | 170 |
| Ethylene glycol phthalate acrylte | Very tacky 10 at 20 | Definite | 1 | 4,350.0 cps (4 at 60) | +1.31 | |
| Isodecyl acrylate | Very tacky 10 at 20 | Very slight | <1 | 4.0 cps | −2.48 | 255 |
| Furfural acrylate | Very tacky 10 at 20 | Definite | 2 | 91.0 cps (1 at 30) | −18.50 | 207 |
| Vinyl-pyrol | Very tacky 10 at 20 | Strong | <1 | 4.0 cps | −3.93 | 215 |

As can be seen from the above table, the trimethylolpropane cyclic formal acrylate exhibits an extremely low volatility combined with low viscosity and excellent cure response.

What is claimed is:

1. An ultraviolet curable coating composition containing, based on total composition weight, between about 40 and 97.5 weight percent of an alpha beta ethylenically unsaturated vinyl polymerizable compound containing at least about two vinyl polymerizable groups per molecule; between about 0 and 57.5 weight percent of an alpha beta ethylenically unsaturated vinyl polymerizable compound containing a single vinyl polymerizable group; an ultraviolet photoinitiator; and between about 2.5 and 60 percent of a comonomer diluent having low viscosity and extremely low volatility and excellent cure response, wherein the said comonomer diluent corresponds to the formula:

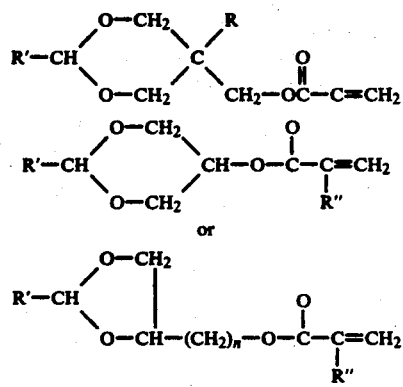

where R is —CH$_3$ or —CH$_2$CH$_3$; R' is hydrogen, C$_1$–C$_3$ alkyl or C$_1$–C$_3$ halogenated alkyl; R" is hydrogen or methyl; and n is 1–4.

2. A composition in accordance with claim 1 wherein R is —CH$_2$CH$_3$, R' is hydrogen, and R" is hydrogen in the formula.

3. A composition in accordance with claim 1 wherein R is —CH$_2$CH$_3$, R' is C$_3$H$_7$, and R" is hydrogen in the formula.

4. A composition in accordance with claim 1 wherein R' is —CCl$_3$ in the formula.

5. A composition in accordance with claim 1 which contains an amine activator as an additional component.

6. A composition in accordance with claim 1 wherein the alpha beta ethylenically unsaturated vinyl polymerizable component containing at least two vinyl polymerizable groups is a diacrylate ester of the diglycidyl ether of bisphenol A.

7. An ultraviolet curable coating composition containing, based on the total composition weight, between about 40 and 97.5 weight percent of a mixture of the diacrylate ester of the diglycidyl ether of bisphenol A, trimethylolpropane triacrylate, and 1,6-hexanediol diacrylate; between about 2.5 and 60 weight percent of trimethylolpropane cyclic formal acrylate diluent; and an ultraviolet photoinitiator.

* * * * *